United States Patent Office 2,989,217
Patented June 20, 1961

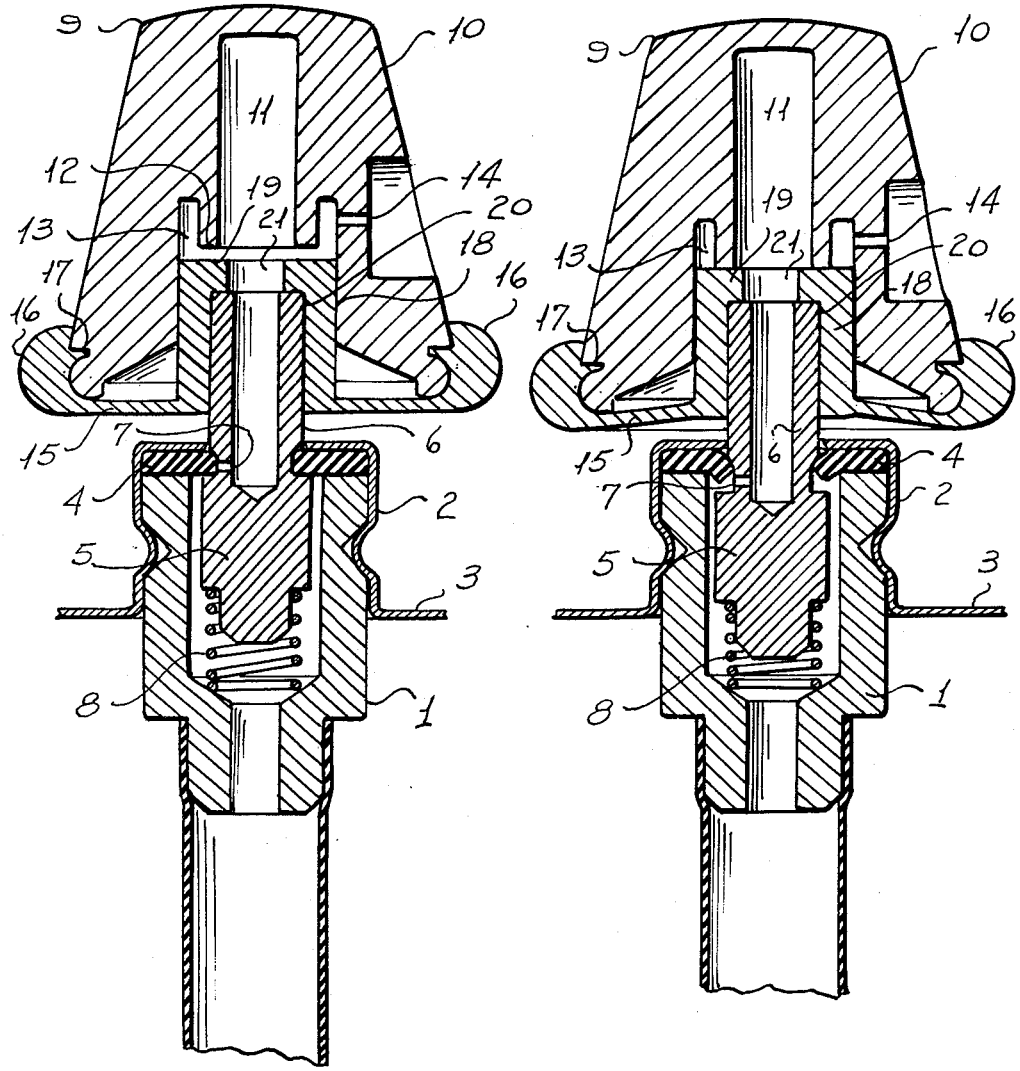

2,989,217
METERING VALVE-OPERATING BUTTON FOR AEROSOL DISPENSER CONTAINERS
John Richard Focht, Yonkers, N.Y., assignor to Precision Valve Corporation, Yonkers, N.Y., a corporation of New York
Filed Mar. 18, 1960, Ser. No. 15,973
2 Claims. (Cl. 222—394)

This invention is a metering valve-operating button for aerosol dispenser containers.

Aerosol dispensers generally embody a container for a liquid "active ingredient," maintained under pressure in the container by a "propellant" and adapted to be autogeneously discharged therefrom through a manually operable valve when the latter is opened, to pass an aerosol mixture of material through a tubular valve stem to a valve operating push button from which it is discharged to the atmosphere. The great majority of aerosol dispensers deliver the aerosol material to the atmosphere as long as the valve is held open and the pressure within the container is sufficient to discharge the material therefrom.

Aerosol dispensers have heretofore been constructed to deliver from the container measured quantities of the material at each operation of the push button. Most of said prior dispensers comprise metering devices built into the container itself and usually forming an inherent portion of the valve, while others are so constituted that the metering function is carried out in the valve operating button. This invention is directed to the latter type and its object is to provide a more satisfactory and efficient metering button than those which have gone before.

My button is provided with a flexible diaphragm having a central hub with a socket to receive the valve stem and there is superimposed upon said diaphragm a superstructure comprising a rigid part with an interior metering chamber normally communicating with an outlet nozzle. The parts are so constituted that, when the button is pressed to open the valve of the container, the outlet nozzle is isolated from the metering chamber which is in communication with the passage through the tubular valve stem, so that said chamber may be charged with a predetermined quantity of the material to be dispensed. When manual pressure on the superimposed portion of the button is released and the valve thereby permitted to close, the outlet nozzle is unsealed so that the material thus trapped within the metering chamber and the hollow valve stem is exhausted through the outlet nozzle.

The button of the present invention may be efficiently and economically manufactured by the well known injection molding technique and the diaphragm and rigid superstructure of the button may be assembled simply and efficiently. Moreover, my structure permits of the utilization of a relatively large diaphragm which requires expenditure of minimum force to isolate the outlet nozzle from the metering chamber and yet provides sufficient resiliency to establish communication between these parts when pressure on the button is released.

I am aware that metering buttons having diaphragms have heretofore been made but in every case the diaphragm was portioned at the top of the button and enclosed with a rigid portion of the button. With such constructions, the finger of the operator is often applied to the rigid portion of the button during application of manual pressure to the diaphragm. When this occurs, the valve is generally at least partially opened before the outlet nozzle is isolated from the metering chamber and thus no accurate metering results. The present invention entirely overcomes this defect.

Features of the invention, other than those adverted to, will be apparent from the hereinafter detailed description and appended claims, when read in conjunction with the accompanying drawing.

The accompanying drawing illustrates one practical embodiment of the invention, but the construction therein shown is to be understood as illustrative, only, and not as defining the limits of the invention.

FIG. 1 is a central section through a metering button embodying the present invention, the same being illustrated as associated with a manually operable valve of an aerosol container. This view shows the position of the parts which they normally occupy when the valve is sealed.

FIG. 2 is a view like unto FIG. 1, but showing the positions of the parts when the button is manually pressed to open the valve of the container.

For the purpose of illustration I have shown the valve operating button of this invention associated with a valve structure of the character illustrated in Patent No. 2,631,814, issued March 17, 1953, to Robert H. Abplanalp which patent is incorporated herein by reference.

The valve here shown has a valve body 1, secured within a valve housing 2 associated with a container indicated generally at 3. An annular sealing gasket 4 is clamped between the valve housing and the valve body. A valve core 5 is positioned within the valve body and has an upstanding tubular valve stem 6 which extends through the opening in the gasket 4 and has one or more orifices 7 which are normally sealed by the gasket 4 when the parts are in the position shown in FIG. 1.

Downward pressure on the valve stem will move the valve stem and core into the position of FIG. 2 to unseal the orifice 7, so that aerosol material within the container 3 may flow through this orifice and through the hollow valve stem and out of the upper end of the latter. A spring 8 normally maintains the valve in the closed position of FIG. 1.

The valve stem is equipped with an appropriate button or cap adapted to be manually pressed in a downward direction to unseal the valve when desired. The present invention is directed, as hereinbefore stated, to a button or cap of novel construction so constituted that it may effect the dispensing of measured quantities of the aerosol material delivered through the valve stem.

In FIGS. 1 and 2 of the drawing I have shown the button 9 of this invention. It may be made of any desired size with respect to the valve and valve housing. In any event it comprises a relatively rigid superstructure 10 provided therein with a metering chamber 11, the lower open bottom of which terminates at a radial shoulder 12, constituting an upper shut-off seat, arranged in a recess 13 which is normally in communication with an outlet nozzle 14 of any desired form.

The recess 13 extends downwardly to the bottom of the rigid superstructure 10 and across the bottom of the latter extends a diaphragm 15. This diaphragm is provided with a peripheral bead 16 shaped to tightly engage with an annular channel 17 as shown. In practice these parts may be injection molded from plastic material, such, for example, as polyethylene, or any other appropriate plastic. The superstructure 10 by virtue of its mass is relatively rigid, whereas the diaphragm 15, being relatively thin, is flexible or resilient in nature.

Formed integral with the central portion of the diaphragm is an upstanding tubular cylindrical hub 18 of an outside diameter to have a close sliding fit with the wall of the recess 13. The upper end of this hub forms a radial shoulder 19, constituting a lower shut-off seat, which under normal conditions of rest is spaced from the shoulder 12 of the part 10 as shown in FIG. 1. A socket 20 in the hub is adapted to receive the upper portion of the valve stem 6 with a fairly tight fit and an opening 21 in the top of the hub establishes communication between the passage through the valve stem and the metering chamber 11 at all times.

The normal relation of the parts is as shown in FIG. 1 from which it will be noted that the orifice 7 of the valve stem is closed and the container is thus sealed. When it is desired to dispense aerosol material from said container, downward pressure is applied on the top surface of the superstructure 10. As this pressure is applied the part 10 moves downwardly until the shoulder 12 thereof comes into engagement with the shoulder 19 of the hub and thus isolates the chamber 11 from the outlet nozzle 14. This relative movement between the part 10 and the diaphragm results because the resistance of the diaphragm to flexing is less than the resistance of the valve stem to recede. Thus during this movement, no movement is imparted to the valve stem. However, continued downward pressure and consequent downward movement of the button will be imparted through the hub 18 of the diaphragm to the upper end of the valve stem with the result that said valve stem will be depressed into the position shown in FIG. 2, to establish communication between the interior of the container 3 and the metering chamber 11. Material will then flow until it fills the metering chamber and the hollow valve stem after which such flow will cease.

If the pressure manually applied to the top of the button is now released, the valve core 5 will immediately elevate under the impulse of the spring 8 until the valve is sealed as shown in FIG. 1, while continued upward movement of the button will lift the shoulder 12 from the shoulder 19. This will open communication between the metering chamber 11 and the outlet nozzle 14 so that the thus measured quantity of the aerosol mixture of material comprising the active ingredient and the propellant which have been trapped in the metering chamber and the valve stem will be autogeneously exhausted through the outlet nozzle. Is will thus be apparent that the radial shoulders 12 and 19 form, in effect, valve elements to permit or cut off communication between the metering chamber and the outlet nozzle.

At the conclusion of the dispensing operation, the parts will appear as shown in FIG. 1 with both the chamber and the passages to the valve stem empty and ready for the next dispensing operation.

It will thus be apparent that on the operation of my button, the operator's finger never contacts the diaphragm. The finger presses directly on the rigid superstructure—never on both this part and the diaphragm. This insures that the outlet nozzle is isolated before the valve can be opened and accurate metering is assured.

The foregoing detailed description sets forth the invention in its preferred practical form, but the invention is to be understood as fully commensurate with the appended claims.

Having thus fully described the invention, what I claim as new and desire to secure by Letters Patent is:

1. In a valve assembly for an aerosol dispenser having a dispensing outlet, and a valve for said outlet having a reciprocable, tubular valve stem, the improvement which consists of an operating button for said valve stem, said button comprising a substantially rigid superstructure having a metering chamber with an open bottom in the upper portion thereof, said superstructure having a recess with an open bottom at the lower portion thereof, an outlet nozzle leading from said recess, an upper shut-off seat surrounding the open bottom of said metering chamber, a flexible diaphragm disposed across the open bottom of said recess, a hub on said diaphragm having a socket therein to snugly receive said tubular valve stem, said socket having a passage establishing communication with said metering chamber with the tubular valve stem, an annular shut-off seat surrounding said passage opposed to, and normally spaced from, said upper, shut-off seat but engageable therewith through flexing of said diaphragm to isolate said metering chamber from said outlet nozzle when the superstructure is depressed to depress said valve stem to open said valve.

2. In a valve assembly for an aerosol dispenser having a dispensing outlet, and a valve for said outlet having a reciprocable, tubular valve stem, the improvement which consists of an operating button comprising a substantially rigid superstructure having a metering chamber with an open bottom at the upper end thereof and a recess with an open bottom at the lower end thereof and an outlet nozzle, an upper, downwardly facing shut-off seat between said metering chamber and said outlet nozzle, a flexible diaphragm across the open bottom of said recess, a socket on said diaphragm to receive said tubular valve stem, said socket having a passage communicating with said metering chamber, said tubular valve stem and said outlet nozzle, and a lower, upwardly facing shut-off seat surrounding said passage and normally spaced from said upper seat but engageable therewith through flexing of the diaphragm to isolate the metering chamber from said outlet nozzle when the rigid superstructure is depressed to depress said valve stem to open said valve.

References Cited in the file of this patent

UNITED STATES PATENTS

| | | |
|---|---|---|
| 2,772,814 | Meyers | Dec. 4, 1956 |
| 2,892,576 | Ward | June 30, 1959 |